United States Patent
Sargoytchev

[11] Patent Number: 5,220,160
[45] Date of Patent: Jun. 15, 1993

[54] ADAPTIVE FIBER OPTIC SHOCK WAVE SENSOR

[75] Inventor: Stoyan I. Sargoytchev, Plovdiv, Bulgaria

[73] Assignee: Cornell Research Foundation, Inc., Ithaca, N.Y.

[21] Appl. No.: 811,106

[22] Filed: Dec. 20, 1991

[51] Int. Cl.$^5$ .............................................. H01J 5/16
[52] U.S. Cl. .................. 250/227.16; 367/906; 250/231.19
[58] Field of Search ............... 367/906, 136, 163, 157, 367/165; 73/700; 250/227.16, 231.19

[56] References Cited

U.S. PATENT DOCUMENTS

| | | |
|---|---|---|
| 4,351,026 | 9/1982 | Phillips .............................. 367/906 |
| 4,408,829 | 10/1983 | Fitzgerald et al. ............. 250/227.16 |
| 4,421,979 | 12/1983 | Asawa et al. |
| 4,436,995 | 3/1984 | Whitten |
| 4,472,628 | 9/1984 | Whitten |
| 4,667,097 | 5/1987 | Fasching et al. |
| 4,770,047 | 9/1988 | Arditty et al. |
| 4,800,267 | 1/1989 | Freal et al. |
| 4,860,586 | 8/1989 | Miers et al. |
| 4,918,305 | 4/1990 | Wlodarczyk et al. |
| 5,025,424 | 6/1991 | Rohrbaugh ........................... 367/906 |

Primary Examiner—David C. Nelms
Attorney, Agent, or Firm—Jones, Tullar & Cooper

[57] ABSTRACT

A fiber optic-type shock wave sensor automatically adapts itself in response to vibration preventing false shock wave detection signals. The sensor includes a sensor element comprising a pair of mating toothed rings and a fiber optic coil disposed between the teeth of the rings. One of the toothed rings is moveable in response to shock waves to cause a bending of the fiber optic coil which detectably alters its light transmission characteristics. A rigid, dome shaped membrane is attached to the moveable ring and is flexibly attached to a body containing the sensor element. The membrane and body form an enclosure for the sensor element, and an aperture is disposed in the body which communicates with the enclosure. A normally closed spring biased check valve covers the aperture, and opens in response to a reduction in pressure in the enclosure to admit additional air or gas to the same. When the sensor is exposed to vibration, the membrane moves back and forth, thereby causing the check valve to cycle open and closed. This results in a pumping effect which draws additional air or gas into the sealed enclosure, and the membrane is caused to move outwardly away from the sensor body. This both causes the membrane to stiffen and its natural frequency to be shifted so that the membrane and moveable ring will be effectively insulated from the resonance effects of vibration, and the sensor will therefore not generate a false shock wave detection signal in response to vibration.

8 Claims, 5 Drawing Sheets

ADAPTIVE FIBER OPTIC SHOCK WAVE SENSOR

BACKGROUND OF THE INVENTION

The present invention relates, in general, to a fiber optic-type shock wave sensor which automatically adapts in response to vibrations to prevent generation of false shock wave detection signals.

Pressure sensors are known in the art which are based on the microbend light modulation principle by which the light transmitting characteristics of a fiber optic are detectably changed when the fiber optic is bent by pressure. Typically, this type of pressure sensor employs a mating pair of toothed elements which are movable relative to one another in response to pressure. A fiber optic is positioned between the teeth of the elements so that pressure induced movement of the elements toward each other will cause their teeth to bend the fiber optic, thereby changing its light transmission characteristics. By employing detection circuitry which monitors the light transmission characteristics of the fiber optic, a pressure pulse or shock wave can therefore either be detected or measured by the sensor. Examples of these types of sensors are illustrated in U.S. Pat. Nos. 4,421,979, 4,436,995, 4,770,047, 4,800,267 and 4,860,586.

A problem with fiber optic pressure or shock wave sensors is that they can be adversely effected by vibration. For example, if the sensor is exposed to a vibration which causes the toothed elements to go into resonance, a false detection of a pressure pulse or shock wave may be generated. Conversely, vibration induced resonance of the sensor elements can also prevent a sensor from accurately detecting a pressure pulse or shock wave.

The foregoing considerations are therefore of particular importance when a fiber optic pressure or shock wave sensor is employed in a high vibration environment. For example, this type of sensor can be very useful on an aircraft for detecting shock waves caused by explosions on or around the aircraft. The sensor can be employed in an on board system which generates a signal in response to an explosion that precedes the effect of the explosion on the main airborne system, and can be used as a command for triggering various devices on the aircraft. Unfortunately, there are many sources of vibration on an airborne aircraft, and any shock wave sensor employed in this environment has to be made insensitive to these vibrations without sacrificing the sensitivity of the sensor to shock waves.

SUMMARY OF THE INVENTION

In view of the foregoing, it is an object of the present invention to provide a shock wave sensor which is insensitive to vibrations, yet provides a high degree of sensitivity to shock waves.

It is another object of the present invention to provide a shock wave sensor which automatically adapts to vibration to eliminate resonance effects on the sensor caused by the vibration.

A more specific object of the invention is to provide a shock wave sensor which employs a simple mechanical arrangement to change the functional characteristics of the sensor in response to vibration to prevent the sensor from being exposed to resonance effects of the vibration.

These and other objects of the invention are achieved through provision of a shock wave sensor which employs an element that is freely moveable in response to a shock wave, but is automatically insulated from vibration induced resonance effects. More particularly, in a preferred embodiment of the invention, a fiber optic-type shock wave sensor is provided having a sensor element comprising a fiber optic coil disposed between the teeth of a mating pair of toothed rings. One of the toothed rings is fixed in a body of the sensor, while the second toothed ring is moveable relative to the first ring in response to a pressure pulse or shock wave. In this manner, a pressure pulse or shock wave will cause the fiber optic coil to be bent, thereby causing a detectable change in its light transmission characteristics.

Attached to the second, moveable toothed ring, is a rigid circular dome shaped membrane which is also attached through a flexible connection to the body of the sensor, and serves in conjunction with the body of the sensor, to form an enclosure for the sensor element.

A first aperture is disposed on the body of the sensor which is opened and closed by means of a normally closed spring biased check valve. When the sensor is exposed to vibration having frequencies near to the natural frequency of the rigid membrane, the rigid membrane moves back and forth, thereby causing the internal pressure in the enclosure to fluctuate. The check valve is designed to be drawn open when the pressure in the enclosure drops due to movement of the membrane away from the sensor body, and to be closed when the pressure in the enclosure increases due to movement of the membrane toward the sensor body. This action causes a pumping effect when the membrane vibrates which draws air into the enclosure, thereby increasing the internal pressure therein. The increase in pressure causes the membrane to bulge outwardly, thereby changing the natural frequency of the vibrating membrane system and preventing the membrane from going into vibration induced resonance. In addition, the stiffness of the flexible connection between the membrane and the sensor body increases, which further reduces the amplitude of vibration of the membrane. The resulting shift in the natural frequency of the membrane and the reduction of the amplitude of its vibration thereby prevents the moveable toothed ring from vibrating enough to cause the fiber optic coil to generate a false output signal.

To enable the membrane to return to its original position when the sensor is no longer exposed to substantial vibrations having frequencies near the natural frequency of the membrane, a second, very small aperture is disposed in the sensor body which communicates with the enclosure so that the excess air or gas drawn into the enclosure through the check valve can slowly bleed out of the enclosure. This arrangement enables the sensor to maintain a higher degree of sensitivity when it is not exposed to vibrations having frequencies near the natural frequency of the membrane.

BRIEF DESCRIPTION OF THE DRAWINGS

The foregoing and additional objects, features and advantages of the present invention will become apparent from the following detailed description of a preferred embodiment thereof, taken in conjunction with the accompanying drawings, in which.

DETAILED DESCRIPTION OF THE PREFERRED EMBODIMENTS

Figure 1:
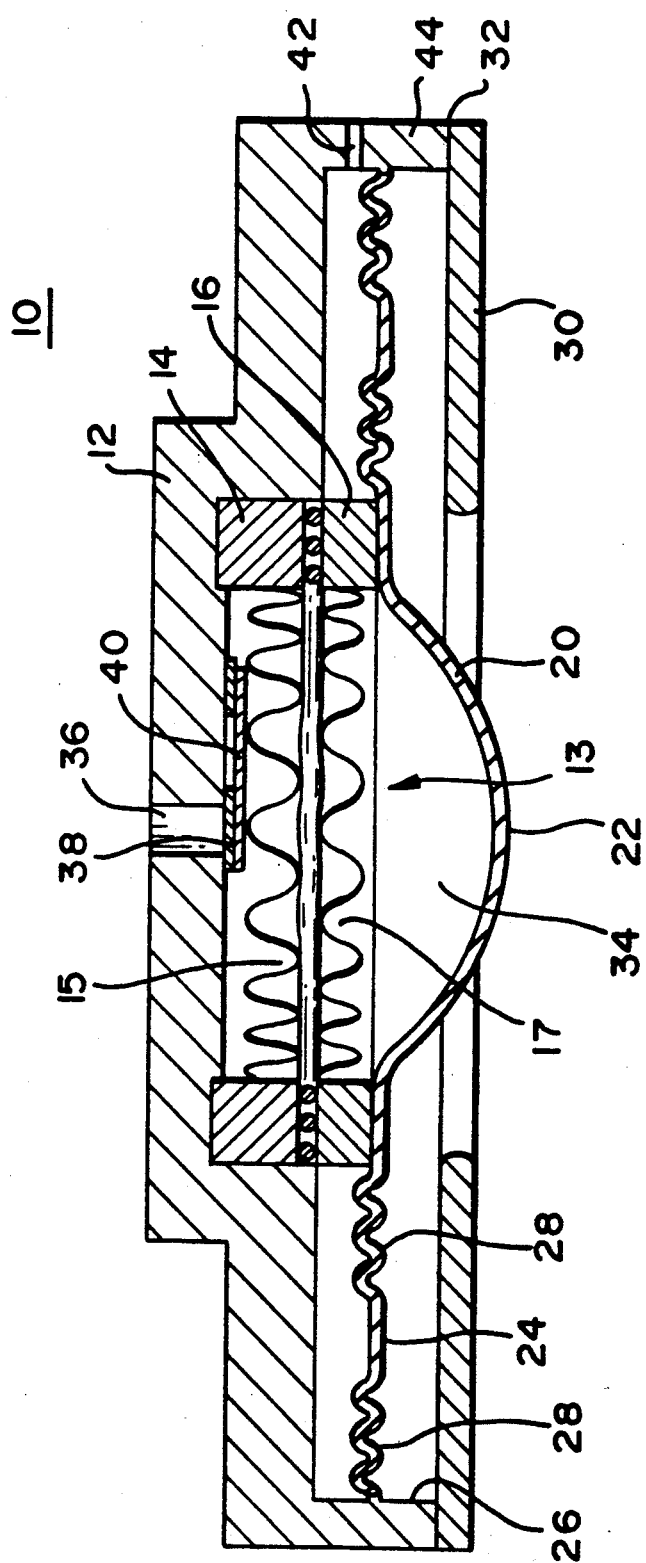
FIG. 1 is a cross sectional side view of a preferred embodiment of a shock wave sensor constructed in accordance with a preferred embodiment of the present invention.
Figure 2:
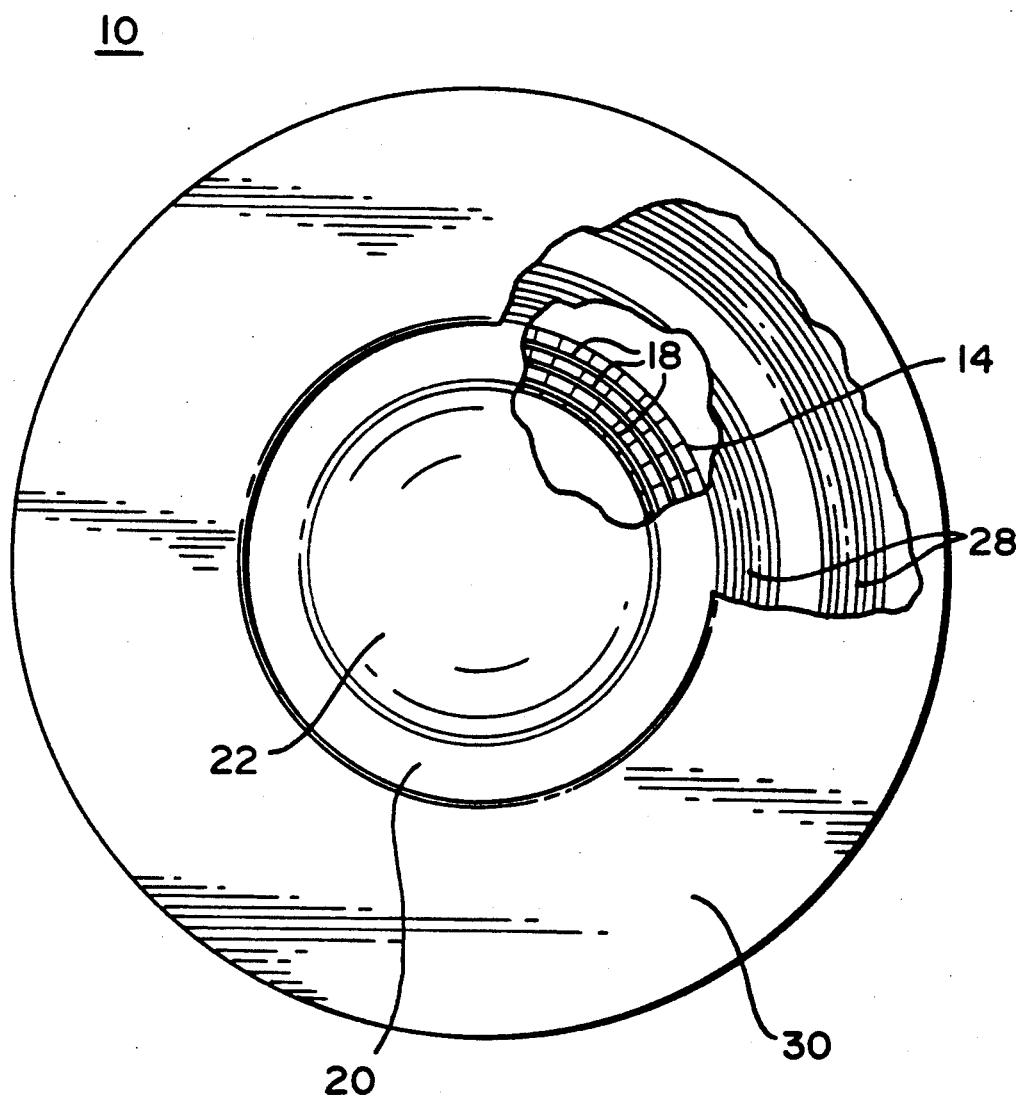
FIG. 2 is a partially cut away front view of the sensor of FIG. 1.

Turning now to a more detailed consideration of a preferred embodiment of the present invention, a shock wave sensor 10 is illustrated in FIGS. 1 and 2 which includes a body 12 containing a sensor element 13. The sensor element 13 comprises a first, fixed toothed ring 14 having a plurality of teeth 15 and a second, moveable toothed ring 16 having a plurality of teeth 17 positioned adjacent said first toothed ring 14 in a mating manner. A fiber optic coil 18 is disposed between the teeth 15 and 17 of the rings 14 and 16, and is connected to conventional detection circuitry via conventional fiber optic connectors (both not shown). When the moveable ring 16 moves toward the fixed ring 14, the teeth 15 and 17 of the two rings will cause the fiber optic coil 18 to bend, thereby detectably changing its optical transmission characteristics.

The second, moveable toothed ring 16 is attached to a circular shaped membrane 20 having a rigid, domed shaped portion 22 which moves in response to incoming shock waves, and thereby causes movement of the second, moveable ring 16. A generally flexible portion 24 flexibly connects the membrane 20 to an inner surface 26 of the sensor body 12. Preferably, the flexible portion 24 includes one or more flexible accordion-type folds 28, and is shielded from incoming shock waves by means of a washer shaped baffle plate 30 attached to an end wall 32 of the sensor body 12.

An enclosure 34 is formed by the sensor body 12 and the membrane 20 which contains the sensor element 13. A first, centrally located aperture 36 is disposed in the sensor body 12 which communicates with the enclosure 34 through a check valve 38. The check valve 38 is spring biased closed by means of a leaf spring 40. A second, very small aperture 42 communicates with the enclosure 34 through a side wall 44 of the body 12.

Figure 3A:
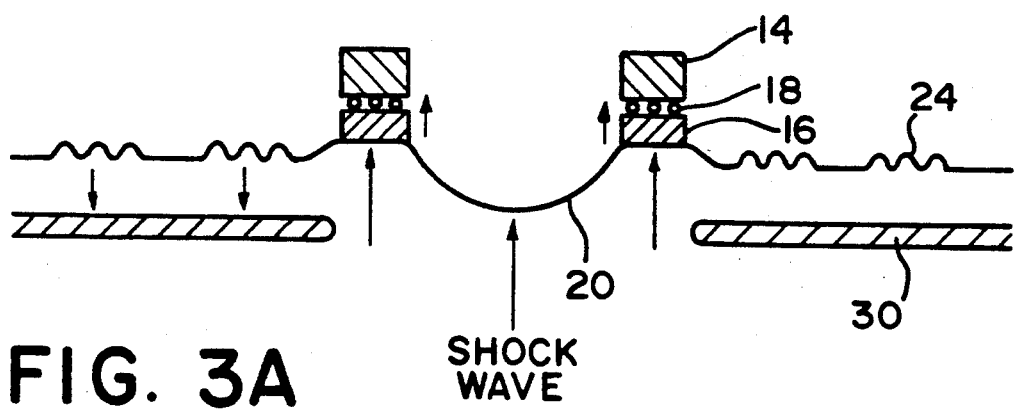
FIGS. 3A-C are schematic illustrations showing the response of the shock wave sensor of FIG. i to different conditions including shock waves and vibration.
Figure 3B:
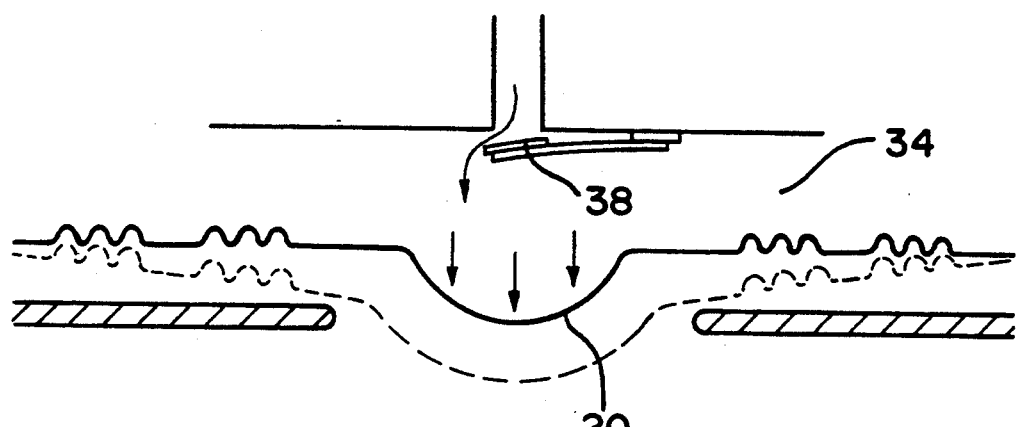
Figure 3C:
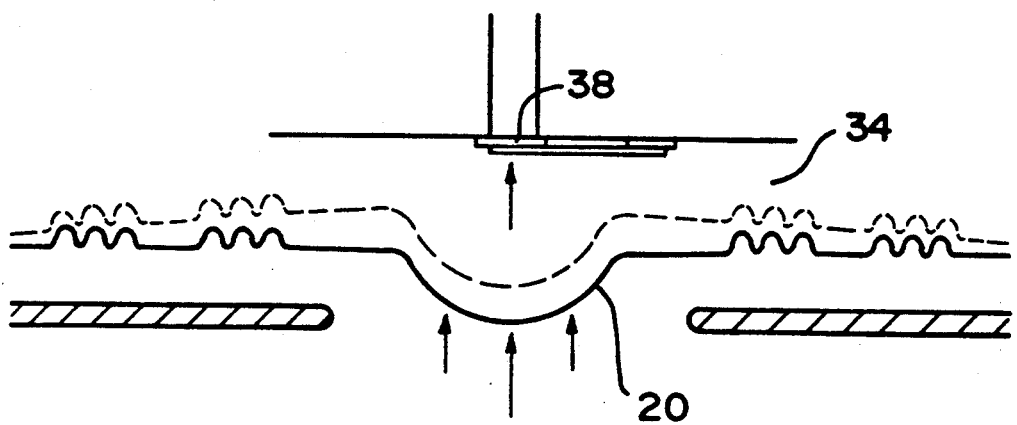

Turning now to FIGS. 3A-C, the operation of the shock wave sensor 10 is schematically illustrated. In particular, when a shock wave strikes the dome shaped rigid portion 22 of the membrane 20 as illustrated in FIG. 3A, the rigid portion 22 moves, thereby moving the second, moveable toothed ring 16 toward the first toothed ring 14. This causes a bending of the fiber optic coil 18 which alters its light transmission characteristics enough to be detected by the sensor's detection circuitry. At the same time, the flexible portion 24 of the membrane 20, which is shielded from the shock wave by the baffle plate 30, moves outwardly to compensate for the rigid portion's inward movement.

If the sensor is exposed to substantial vibration having frequencies near the natural frequency of the membrane 20, it will respond as illustrated in FIGS. 3B and 3C. In particular, external vibration having frequencies near to the natural frequency of the membrane 20, will cause it, including the rigid portion 22 thereof, to move back and forth. Movement of the membrane 20 away from the sensor body 12 as illustrated in FIG. 3B, increases the volume of the enclosure 34, thereby decreasing the pressure therein. This causes the spring biased check valve 38 to open, thereby admitting additional gas or air to the enclosure 34. When the membrane 20 moves toward the sensor body 12 during a vibration cycle as illustrated in FIG. 3C, the pressure in the enclosure 34 increases, thereby closing the check valve 38.

Figure 4:
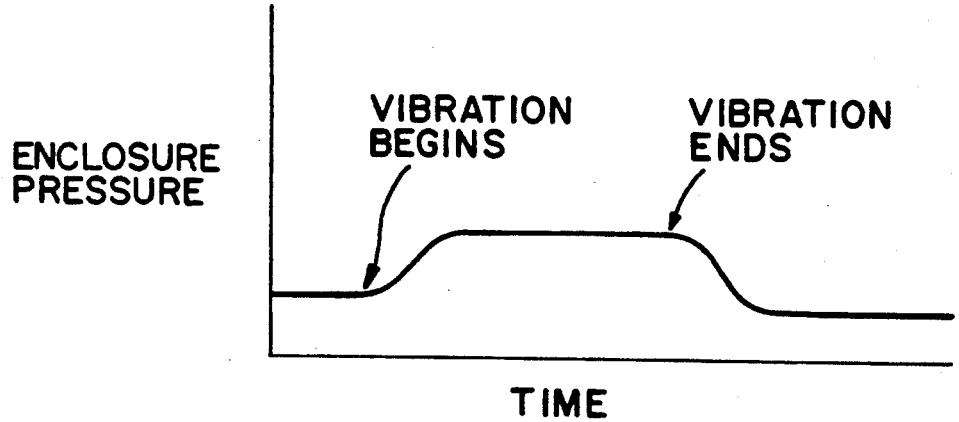
FIG. 4 is a graph illustrating variations in the internal pressure of the sensor in response to vibration.

This cycle will repeat itself during exposure of the sensor to vibration and cause a pumping effect which increases the pressure in the enclosure 34 as graphically illustrated in FIG. 4. As the pressure increases, the membrane 20 is moved further away from the body 12 as illustrated by the dashed lines in FIG. 3B. This movement causes the natural frequency of the membrane 20 to shift and also causes the flexible portion 24 thereof to stiffen, thereby reducing the vibration amplitude of the membrane 20. This therefore not only prevents the membrane 20 from going into resonance in response to vibration, but also reduces the amplitude of any movement thereof caused by vibration. As a result, the moveable toothed ring 16 will not move substantially in response to vibration, and a false signal will not be generated by the sensor 10.

Once the sensor 10 is no longer exposed to vibration, the additional air or gas in the enclosure 34 will slowly be bled through the very small aperture 42, thereby returning the membrane 22 its normal, rest position. Maximum sensitivity of the sensor to shock waves during nonvibration conditions can therefore be maintained with this arrangement.

Figure 5:
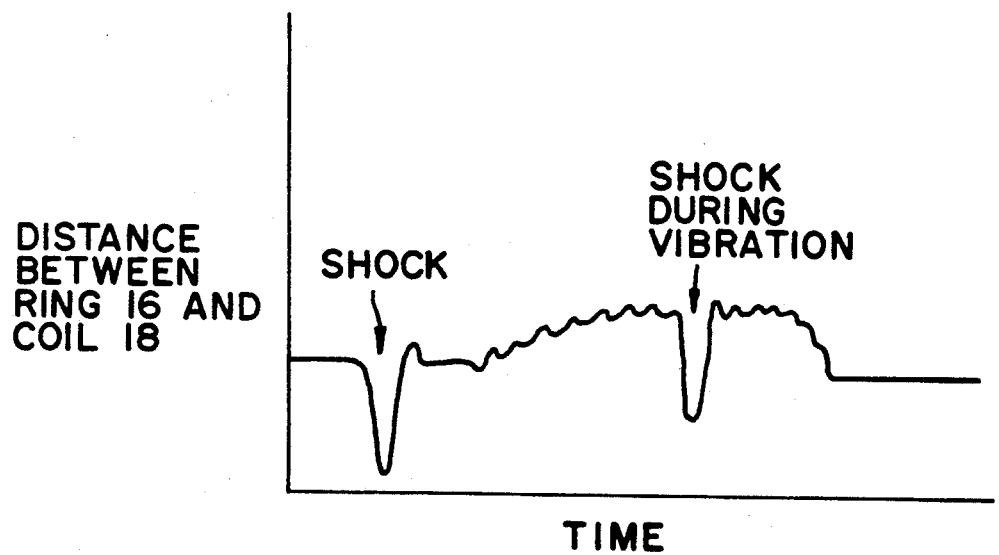
FIG. 5 is a graph illustrating the mechanical response of the sensor of FIG. 1 to a shock wave during both vibration and nonvibration conditions.

As illustrated in FIG. 5, the movement of the moveable ring 16 away from the fiber optic coil 18 during vibration does not prevent a shock wave from causing the moveable ring 16 to move close enough toward the fiber optic coil 18 to cause a detectable bending of the coil. Thus, the sensor can still detect a shock wave even during vibration conditions. Sensitivity of the sensor depends on a number of factors, including the mechanical characteristics of the membrane 20, the free distance of the moveable ring 16 and the spatial frequency of the optical fiber modulation. A proper dynamic range and sensitivity can therefore be easily achieved by varying these parameters.

Figure 6:
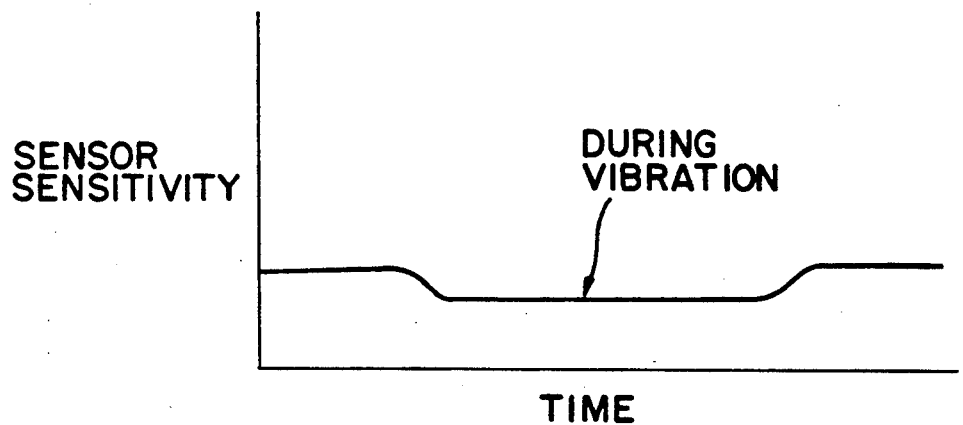
FIG. 6 is a graph illustrating the sensitivity of the sensor of FIG. 1 during vibration and nonvibration conditions.

As illustrated in FIG. 6, the sensitivity of the sensor is somewhat reduced during exposure to vibration, but as illustrated in FIG. 5, this is negligible when detecting shock waves with big amplitudes. The reduction of sensitivity is obviously more significant when it is desired to detect shock waves with smaller amplitudes, but it is still possible to detect them through proper design of the sensor. In particular, the dynamic range of the sensor can be shifted by changing the rest position of the moveable ring 16 such that its teeth 17 cause a slight bending of the fiber optic coil 18 during steady state rest conditions.

Figure 7:
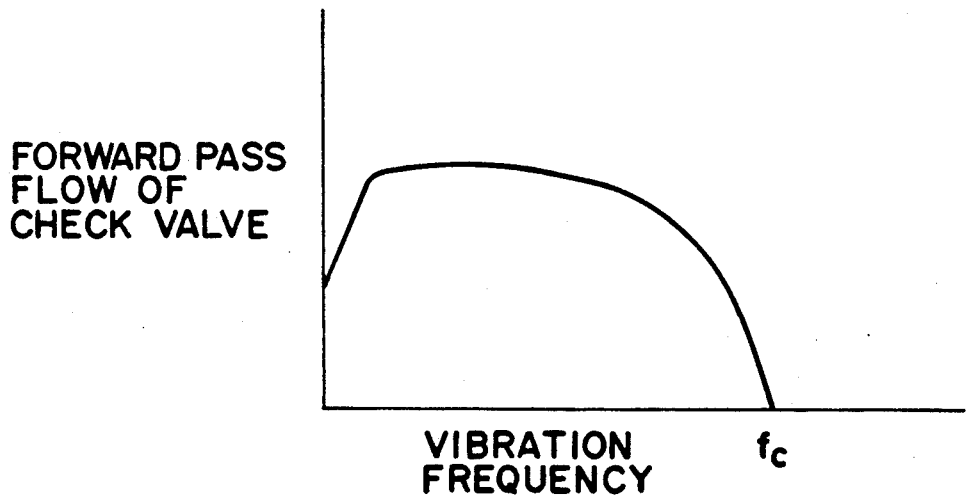
FIG. 7 is a graph illustrating the forward pass flow characteristics of the check valve of the sensor of FIG. 1 as a function of vibration frequency.

As illustrated in FIG. 7, the forward pass flow characteristics of the check valve 38 must be such that air or gas will be admitted to the enclosure 34 in response to exposure of the sensor to vibrations over a wide range of frequencies. The critical frequency, $f_c$, is the cut off frequency above which the check valve can no longer open, and should be chosen higher than the highest frequency of vibration to which it is anticipated the sensor 10 will be exposed.

Although the invention has been disclosed in terms of a preferred embodiment, it will be understood that numerous variations and modifications to be made thereto without departing from the scope of the invention as defined in the following claims.

What is claimed is:

1. A shock wave sensor comprising:
   a) a sensor body;
   b) a shock wave responsive fiber optic microbend modulation type sensor element including:
      i) a first, fixed toothed ring disposed in said sensor body;
      ii) a second, moveable toothed ring positioned adjacent said first, fixed toothed ring in a mating manner; and,
      iii) a fiber optic coil disposed between the teeth of said first and second toothed rings;
   c) a dome shaped membrane rigidly attached to said second, moveable toothed ring and flexibly attached to said body to form an enclosure for said sensor element;
   d) a first aperture disposed in said sensor body and communicating with said enclosure; and,
   e) a spring biased check valve positioned to open and close said aperture in response to pressure fluctuations in said enclosure caused by vibration induced back and forth movement of said membrane; said check valve normally biased closed and being caused to open in response to a pressure decrease in said enclosure caused by movement of said membrane away from said body;
   whereby, a shock wave will cause said membrane, and therefore said second, moveable ring to move toward said first, fixed ring, thereby bending said fiber optic coil and detectably changing its light transmission characteristics, and vibration of said membrane will cause said check valve to open said aperture when said membrane moves away from said body, thereby causing a pumping effect which increases the pressure in the enclosure and causes the membrane to move away from said body, thereby shifting its natural frequency and causing it to stiffen, and preventing said second, moveable ring, from bending said fiber optic coil in response to vibration.

2. The shock wave sensor of claim 1 further including a second, very small aperture disposed in said body for slowing bleeding off excess pressure from said enclosure to return said membrane to a rest position when said sensor is not exposed to vibration.

3. A shock wave sensor comprising:
   a) a pressure responsive fiber optic microbend modulation type sensor element for generating an output signal in response to a sensed shock wave, said sensor element being disposed in a sensor body;
   b) a membrane rigidly attached to a moveable shock wave responsive portion of said sensor element and flexibly attached to said sensor body, said sensor body and membrane forming an enclosure for said sensor element;
   c) an aperture disposed in said body and communicating with said enclosure; and
   d) a normally closed spring biased check valve for opening said aperture when pressure in said enclosure decreases;
   wherein, vibration of said membrane results in a pumping action that will cycle said check valve opened and closed, thereby drawing external air into said enclosure and causing the internal pressure therein to increase;
   whereby, said membrane will move away from said body and stiffen so that its natural frequency is shifted, and the amplitude of vibration of both the membrane and said moveable portion of said sensor element is substantially reduced so that the sensor element will not generate spurious vibration induced output signals.

4. A shock wave sensor comprising:
   a) a pressure responsive sensor element for generating an output signal in response to a sensed shock wave; and
   b) means responsive to vibration of said sensor element to shift the element's natural frequency, and thereby prevent said element from going into resonance when it is exposed to vibration.

5. The shock wave sensor of claim 4, wherein said vibration responsive means comprises:
   i) a membrane rigidly attached to a moveable shock wave responsive portion of said sensor element; and
   ii) means to cause said membrane to stiffen in response to vibration, thereby shifting its natural frequency and preventing said membrane and moveable portion of said sensor element from going into resonance in response to vibration.

6. The shock wave sensor of claim 5, wherein said sensor element is disposed in a sensor body, said membrane is flexibly attached to said sensor body and forms with said sensor body an enclosure for said sensor element; and
   wherein the means to cause said membrane to stiffen causes the internal pressure in said enclosure to increase, thereby moving said membrane away from said body and causing it to stiffen.

7. The shock wave sensor of claim 6, wherein said means to cause said membrane to stiffen further comprises means to pump external air into said enclosure to increase pressure therein.

8. The shock wave sensor of claim 4, wherein said sensor element is a fiber optical microbend modulation type.

* * * * *